Dec. 6, 1938.   C. B. BOLES   2,139,110
REFRIGERATING APPARATUS
Filed Aug. 31, 1935

INVENTOR.
Chalmers B. Boles
BY
Spencer Hardman and John
ATTORNEYS

Patented Dec. 6, 1938

2,139,110

UNITED STATES PATENT OFFICE 2,139,110

REFRIGERATING APPARATUS

Chalmers B. Boles, Dayton, Ohio, assignor to General Motors Corporation, Dayton, Ohio, a corporation of Delaware Application August 31, 1935, Serial No. 38,801

4 Claims. (Cl. 62—3)

This invention relates to refrigerating apparatus and more particularly to liquid control means for refrigerating systems.

In order to design lowest cost refrigerating systems for performing a desired amount of refrigeration, it is most economical to design such a system so that it operates continuously at full load. If possible, it is also desirable to operate continuously at light loads providing the efficiency can be maintained and the temperatures are properly controlled. Restrictors have been provided heretofore which are so formed that the temperatures are regulated so as to provide satisfactory food compartment temperatures in the case of the domestic refrigerator even when the compressor operates continuously under normal conditions. However, even though the control is simplified by such an arrangement, it is found more desirable to cycle the refrigerating apparatus at lighter loads in order to secure better efficiency and to prevent excessively cold temperatures under extremely light loads.

In spite of these precautions, difficulty was encountered because of the fact that too much liquid passed into the evaporator under light load conditions. This causes a waste of energy because the excess liquid refrigerant must be disposed of in some inefficient way unless this excessive flow can be prevented in some manner.

It is an object of my invention to provide a means for preventing this excessive flow of liquid refrigerant into the evaporating means under light load conditions.

It is a further object of my invention to provide a means without moving parts which will reduce the flow of refrigerant from the liquefying means to the evaporator under light load conditions.

It is a further object of my invention to provide in a refrigerating system having a restrictor a means for employing the heat of the liquid refrigerant to reduce the flow of refrigerant from the liquefying means to the evaporating means.

Further objects and advantages of the present invention will be apparent from the following description, reference being had to the accompanying drawing wherein a preferred form of the present invention is clearly shown.

Figure 1:
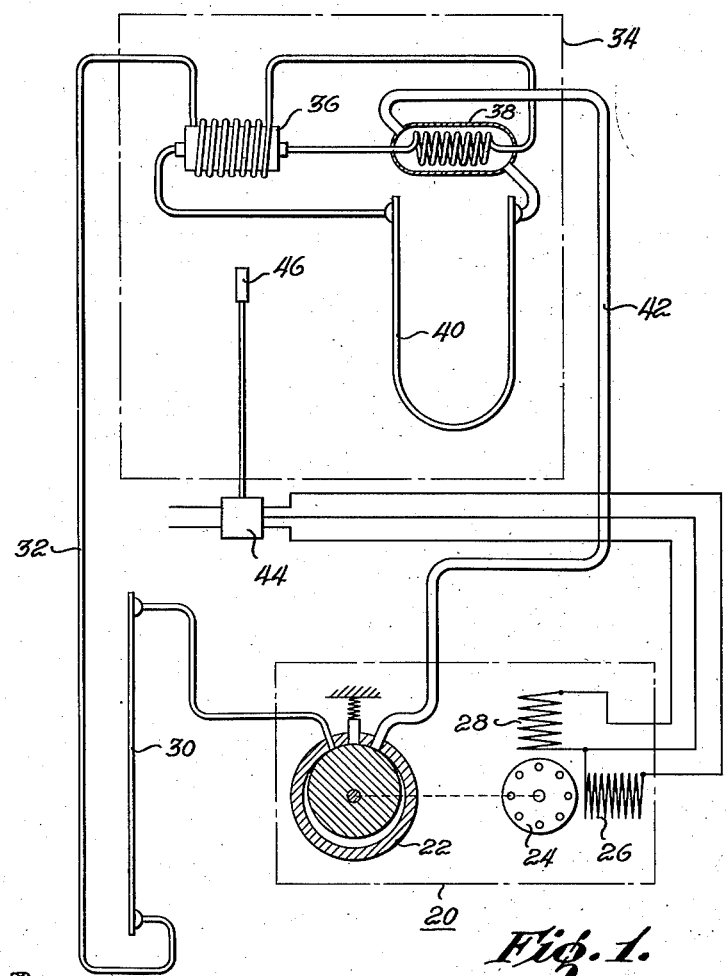
Fig. 1 is a diagrammatic illustration of a refrigerating system embodying one form of my invention.
Figure 2:
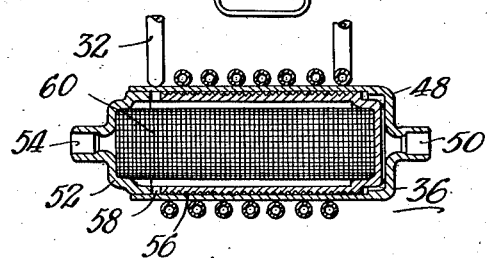
Fig. 2 is a sectional view of the restrictor 36 shown in Fig. 1.

Briefly, in the form of the invention shown in the drawing, there is provided a compressor and a condenser for liquefying refrigerant from which refrigerant is conducted through a restrictor provided with a fixed elongated orifice which controls the flow of liquid refrigerant into the evaporating means. The liquid refrigerant, however, after leaving the condenser first passes into heat exchange relation with the restrictor within the food compartment and thence into heat exchange relation with the return gases from the evaporator before it reaches the restrictor. The compressor is, of course, driven by an electric motor and controlled by a thermostatic switch means which cycles the refrigerating apparatus at lower box temperatures but when the evaporator is at a high temperature the motor and compressor operate continuously. By passing the refrigerant first into heat exchange relation with the restrictor, the flow through the restrictor is reduced at light loads through the expansion of the liquid refrigerant in the restrictor by the increased temperature of the restrictor.

Referring now more particularly to the drawing, there is shown diagrammatically a sealed unit 20 containing a refrigerant compressor 22, driven by a split-phase electric motor 24 having a starting winding 26 and a running winding 28. The compressor 22 compresses the refrigerant and forwards the refrigerant to a vertical flat plate-type condenser 30 where the compressed refrigerant is liquefied. The liquid refrigerant then flows through a tube 32 preferably a capillary tube of the correct size in cross section to permit the flow of liquid without substantial reduction in pressure, but which offers sufficient resistance to gaseous refrigerant to insure condensation of compressed refrigerant within the condenser 30. I prefer to use a capillary tube having an inside diameter of about 0.055 for small household refrigerators. The capillary tube passes into the insulated food compartment or space to be cooled which is designated by the reference character 34.

This capillary tube then is wrapped around the restrictor 36 so that there may be an exchange of heat between the liquid refrigerant in the capillary tube and the refrigerant within the restrictor 36. From the portion coiled about the restrictor 36, the capillary tube extends into a heat exchanger 38 where the liquid refrigerant passing through the capillary tube is placed in heat exchange relation with the evaporated refrigerant which normally leaves the evaporator and returns to the compressor. After passing through the heat exchanger 38 the capillary tube extends through the inlet of the restrictor 36. The restrictor 36 is provided with a fixed elongated orifice of relatively great length and is preferably so designed that it provides a sufficient restriction to the flow of liquid refrigerant to admit only the proper amount of liquid refrigerant to the evaporating means under full load.

The restrictor 36 includes an outer casing 48 having an inlet 50 at one end together with a closed inner casing 52 having an outlet 54 at the end opposite the inlet 50. The casing 52 is provided with a threaded outer surface 56 so that the refrigerant after passing through the inlet 50 passes between the threads 56 and the outer casing 48 and finally enters the apertures 58 which lead the gas into the interior of the member 52. The member 52 may be provided with a screen 60 on the inside for preventing particles from circulating through the refrigerating system. The passage between the threads 56 and the outer casing 48 constitutes an elongated orifice which restricts the flow of liquid refrigerant from the condenser 30 to the evaporating means 40.

However, since the amount of liquid refrigerant required at full load is greater than the amount of liquid refrigerant required under lesser loads, it is necessary that some means be provided for reducing the flow of refrigerant at lighter loads. After passing through the restrictor, the liquid refrigerant passes into the evaporating means 40 where the liquid refrigerant evaporates and absorbs heat from the air within the compartment 34. The evaporated refrigerant then passes into the heat exchanger 38 where it absorbs heat from the liquid refrigerant before it reaches the restrictor, after which the evaporated refrigerant is returned to the compressor through the suction line 42. The system is of such a character that the head pressure reduces much more quickly than the back pressure when the refrigeration load diminishes. But, even with this form of compensation, too much liquid refrigerant passes into the evaporator at lighter loads.

Therefore, I have placed the capillary tube first in heat exchange relation with the restrictor 36 and then in heat exchange relation with the refrigerant from the evaporator so that heat from the liquid refrigerant in the capillary tube will be transferred to the refrigerant in the restrictor and will heat and expand this refrigerant in the restrictor so that the resistance to the flow of refrigerant from the compressor to the evaporator is increased. Under light load conditions, the evaporated refrigerant passing through the heat exchanger 38 becomes more and more saturated as the load is reduced. This causes the liquid refrigerant passing into this restrictor to become cold and this increases the differential in temperature between the liquid refrigerant in the coil about the restrictor 36 and the liquid refrigerant passing through the restrictor 36. The gas from the condenser under light loads is, of course, warmer than the liquid which passes through the capillary tube under heavy loads. This is because the gas is warmed by compression in the compressor and it passes through the condenser so rapidly that it is not cooled sufficiently to condense and, therefore, is above the condensing temperature at the particular pressure conditions existing in the condenser. Thus, this warm gas passing through the capillary tube will have a greater heating effect upon the restrictor 36 and, thereby, will cause evaporation of the liquid refrigerant in the restrictor 36 to reduce the flow of liquid into the evaporating means and to cause the capillary tube to again be filled with liquid. Since more heat is applied to the liquid refrigerant in the restrictor, a greater amount of resistance to the flow of refrigerant through the restrictor will, therefore, be provided so as to cause the flow of liquid refrigerant to more nearly approach the desired amount under light loads.

This greater amount of resistance to the flow of refrigerant through the restrictor is provided by the changing of a portion of the liquid into gas by the application of heat. Since the gas occupies a much greater amount of space than the amount of space occupied by the same weight of liquid, a considerable additional restriction to the flow of the liquid refrigerant is provided. While this reduces the efficiency of the apparatus slightly under light loads, this is not particularly objectionable since the control of the flow of liquid refrigerant under light load conditions is much more important. This is due to the fact that the cost of operation under light loads is relatively small and the slightly added refrigerant load by the reduction of efficiency under such conditions is of practically no significance. On the other hand, under light loads, it is important to properly control the supply of liquid refrigerant so that the evaporator 40 will not become excessively full of liquid and the proper operation of the system disturbed.

It is, however, important to have full efficiency at full loads so that adequate cooling may be obtained under such conditions. Under such conditions the heat exchanger 38 is of utmost importance in maintaining the maximum capacity of the system while there is little heat transferred from the conduit 32 to the restrictor 36. Under such conditions the amount of restriction to the flow of liquid in the evaporating means 40 is as low as possible.

As is customary, a control switch 44 controlled by a thermostatic bulb 46 mounted within the compartment to be cooled is employed for starting and stopping the compressor motor under light load conditions in order to provide a better efficiency.

While the form of embodiment of the invention as herein disclosed constitutes a preferred form, it is to be understood that other forms might be adopted, all coming within the scope of the claims which follow.

What is claimed is as follows:

1. Refrigerating apparatus including a refrigerant liquefying means having an inlet for evaporated refrigerant and an outlet for compressed refrigerant, a refrigerant evaporating means having an inlet and an outlet, a restrictor connected to the inlet of the evaporating means for restricting the flow of liquid refrigerant to the evaporating means, a capillary tube connecting the outlet of the liquefying means with the inlet of the restrictor and having an intermediate portion in heat exchange relation with said restrictor, and a suction conduit means connecting the outlet of the evaporating means with the inlet of the liquefying means.

2. Refrigerating apparatus including a refrigerant liquefying means having an inlet for evaporated refrigerant and an outlet for compressed refrigerant, a refrigerant evaporating means having an inlet and an outlet, a restrictor connected to the inlet of the evaporating means for restricting the flow of liquid refrigerant to the evaporating means, a capillary tube connecting the outlet of the liquefying means with the inlet of the restrictor and having an intermediate portion in heat exchange relation with said restrictor, and a suction conduit means connecting the outlet of the evaporating means with the inlet of the liquefying means, said suction conduit means having a portion in heat exchange relation with a portion of said capillary tube means.

3. Refrigerating apparatus including a refrigerant liquefying means having an inlet for evaporated refrigerant and an outlet for compressed refrigerant, a refrigerant evaporating means having an inlet and an outlet, a liquid conducting means connecting the outlet of the liquefying means with the inlet of the evaporating means, an evaporated refrigerant conducting means connecting the outlet of the evaporating means with the inlet of the liquefying means, said liquid conducting and evaporated refrigerant conducting means having a heat exchange portion for transferring heat from the liquid to the evaporated refrigerant, said liquid conducting means having a restrictor between the heat exchange portion and the evaporating means; said liquid conducting means also having a portion between the heat exchange portion and the liquefying means extending in heat exchange relation with the restrictor.

4. Refrigerating apparatus including a refrigerant liquefying means having an inlet and an outlet, a refrigerant evaporating means having an inlet and an outlet, means forming an elongated orifice connected to the inlet of the evaporating means for restricting the flow of liquid refrigerant to the evaporating means, a refrigerant conducting means connecting the outlet of the liquefying means with the inlet of the elongated orifice and having an intermediate portion in heat exchange relation with said means forming an elongated orifice, and conduit means connecting the outlet of the evaporating means with the inlet of the liquefying means.

CHALMERS B. BOLES.